United States Patent
Guinot et al.

(10) Patent No.: US 9,221,559 B2
(45) Date of Patent: Dec. 29, 2015

(54) AUTONOMOUS SPONTANEOUS DEPLOYMENT DEPLOYABLE MAST AND SATELLITE INCLUDING AT LEAST ONE SUCH MAST

(71) Applicant: THALES, Neuilly-sur-Seine (FR)

(72) Inventors: François Guinot, Cannes-la-Bocca (FR); Frédéric Falzon, Cannes-la-Bocca (FR); Julien Ducarne, Cannes (FR)

(73) Assignee: THALES, Courbevoie (FR)

( * ) Notice: Subject to any disclaimer, the term of this patent is extended or adjusted under 35 U.S.C. 154(b) by 124 days.

(21) Appl. No.: 14/223,658

(22) Filed: Mar. 24, 2014

(65) Prior Publication Data
US 2014/0291451 A1 Oct. 2, 2014

(30) Foreign Application Priority Data
Mar. 29, 2013 (FR) ...................................... 13 00731

(51) Int. Cl.
*B64G 1/22* (2006.01)
*B64G 1/66* (2006.01)
*B64G 1/10* (2006.01)

(52) U.S. Cl.
CPC *B64G 1/222* (2013.01); *B64G 1/66* (2013.01); *B64G 2001/1092* (2013.01)

(58) Field of Classification Search
CPC ... B64G 1/222; B64G 1/66; B64G 2001/1092
USPC ...................... 33/755, 771; 52/645, 646, 108; 212/299; 244/172.7
See application file for complete search history.

(56) References Cited

U.S. PATENT DOCUMENTS

| 4,532,742 | A | * | 8/1985 | Miura | ................... E04H 12/185 52/108 |
|---|---|---|---|---|---|
| 4,866,892 | A | | 9/1989 | Satoh et al. | |
| 2008/0283670 | A1 | | 11/2008 | Harvey et al. | |
| 2008/0290221 | A1 | * | 11/2008 | Dupuis | .................. B64G 1/222 244/172.6 |
| 2010/0031525 | A1 | * | 2/2010 | Allezy | ................ B29C 61/0616 33/771 |

FOREIGN PATENT DOCUMENTS

| EP | 1676776 A1 | 7/2006 |
|---|---|---|
| EP | 2143641 A1 | 1/2010 |

OTHER PUBLICATIONS

G. Aridon, et al., "On the correction Capability of a Deployed Tape-Spring Hexapod", Mechanism and Machine Theory, Sep. 27, 2007, pp. 1009-1023, vol. 43, No. 8, Elsevier Ltd., Amsterdam, XP22711040.

* cited by examiner

*Primary Examiner* — Christopher P Ellis
*Assistant Examiner* — Richard G Davis
(74) *Attorney, Agent, or Firm* — Baker & Hostetler LLP (57) ABSTRACT

An autonomous spontaneous deployment deployable mast includes at least one elementary structural unit having a longitudinal deployment axis X and two platforms parallel to a plane YZ orthogonal to the axis X. The elementary structural unit includes N stages stacked above one another parallel to the longitudinal deployment axis X, where N is greater than 1. Each stage includes at least three longitudinal flexible tape-springs, the N stages being fixed to one another two by two by means of connecting platforms parallel to the plane YZ and two contiguous lower and upper stages being offset angularly relative to each other by rotation about the deployment axis X, the tape-springs of the lower stage being interleaved between the tape-springs of the upper stage.

9 Claims, 8 Drawing Sheets

AUTONOMOUS SPONTANEOUS DEPLOYMENT DEPLOYABLE MAST AND SATELLITE INCLUDING AT LEAST ONE SUCH MAST

CROSS-REFERENCE TO RELATED APPLICATION

This application claims priority to foreign French patent application No. FR 1300731, filed on Mar. 29, 2013, the disclosure of which is incorporated by reference in its entirety.

FIELD OF THE INVENTION

The present invention concerns an autonomous spontaneous deployment deployable mast and a satellite including at least one such mast. It notably applies to the field of space equipment that must be deployed in orbit and more particularly to space equipment for satellites, such as sensors or antennas or instruments of long focal length such as telescopes, for example.

BACKGROUND

A deployable mast designed to connect two space equipments several metres apart is generally constituted of a plurality of mast segments stacked above one another, articulated to each other and deployment of which is motorized. Each mast segment is generally composed of a plurality of rigid beams articulated by hinges and locked by latches. This type of mast has the disadvantage of necessitating the use of a motor for deployment and suffers from high mass and articulation reliability problems. Moreover, the beams being rigid, in the stowed position under the nose cap of a launch vehicle the mast occupies a large overall size. The space allocated to deployable structures under the nose cap of a launch vehicle being limited, it is important to reduce the overall size of the mast when it is in the stowed position, so as to optimize the area thereof in the deployed position. The mast must therefore have as high as possible a deployed length/stacked volume ratio at the same time as ensuring a low mass, and sufficiently high stability and stiffness of the mast in the deployed position to be compatible with space applications.

SUMMARY OF THE INVENTION

The object of the invention is to produce a deployable mast that does not have the disadvantages of existing deployable masts, having the advantage of being of small overall size, light in weight, simple to produce, having an optimized volume of the mast when it is stowed under the nose cap of a launch vehicle, allowing reliable deployment in orbit over a great length and control of deployment without using a motor, and making the mast stiff and stable when it is deployed.

To this end, the invention concerns an autonomous spontaneous deployment deployable mast including at least one elementary structural unit having a longitudinal deployment axis X, the elementary structural unit including a lower platform and an upper platform both parallel to a plane YZ orthogonal to the axis X and N stages stacked above one another parallel to the longitudinal deployment axis X, where N is greater than 1. Each stage includes at least three longitudinal flexible tape-springs, the N stages being fixed to one another two by two by means of connecting platforms parallel to the plane YZ, two contiguous lower and upper stages being offset angularly relative to each other by rotation about the deployment axis X, the tape-springs of the lower stage being interleaved between the tape-springs of the upper stage.

All the tape-springs are advantageously identical and of the same length.

Two contiguous lower and upper stages are advantageously fixed to each other by a connecting platform common to the two contiguous stages.

Each upper platform, lower platform and connecting platform advantageously includes regularly distributed fixing lugs, each fixing lug being dedicated to fixing one end of a tape-spring.

The two contiguous lower and upper stages advantageously include a longitudinal overlap area.

The fixing lugs fastened to each connecting platform are advantageously inclined relative to the plane YZ of the connecting platform, the inclination of the fixing lugs of the tape-springs of the lower stage being oriented toward the top of the mast and the inclination of the fixing lugs of the tape-springs of the upper stage being oriented toward the bottom of the mast.

In the stowed position, all the tape-springs are advantageously bent in two, in the direction of their length, and all the lower, connecting and upper platforms of the same structural unit are advantageously stacked above one another.

The deployable mast advantageously includes a plurality of identical structural units stacked above one another.

The invention also concerns a satellite including at least one autonomous spontaneous deployment deployable mast.

BRIEF DESCRIPTION OF THE DRAWINGS

Other features and advantages of the invention will become clearly apparent in the course of the description given by way of purely illustrative and nonlimiting example with reference to the appended diagrammatic drawings, which represent.

DETAILED DESCRIPTION

Figure 1:
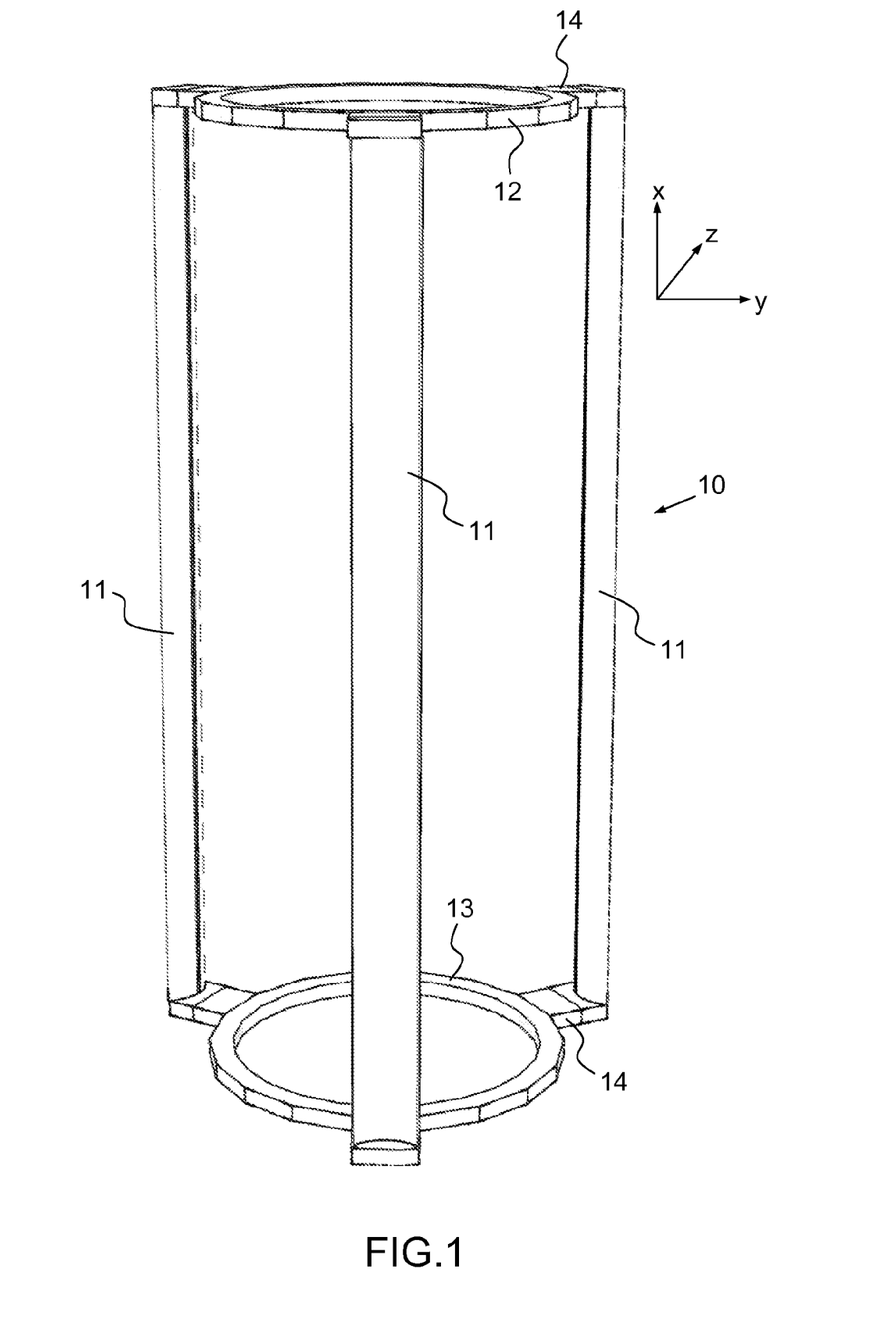
FIG. 1: a diagram of a first example of a mast in accordance with the invention in a deployed position, the mast including a single-stage elementary structural unit.

FIG. 1 shows one example of a deployable mast in accordance with the invention in a deployed position, the mast including a single-stage elementary structural unit. The elementary structural unit 10 is constituted of at least three tape-springs 11 extending along a longitudinal deployment axis X, an upper platform 12 and a lower platform 13. The lower and upper platforms are parallel to a plane YZ orthogonal to the axis X. The tape-springs are all identical, and all have the same length and the same shape. Each tape-spring has a lower end rigidly attached to the lower platform 13 and an upper end rigidly attached to the upper platform 12.

Figure 2A:
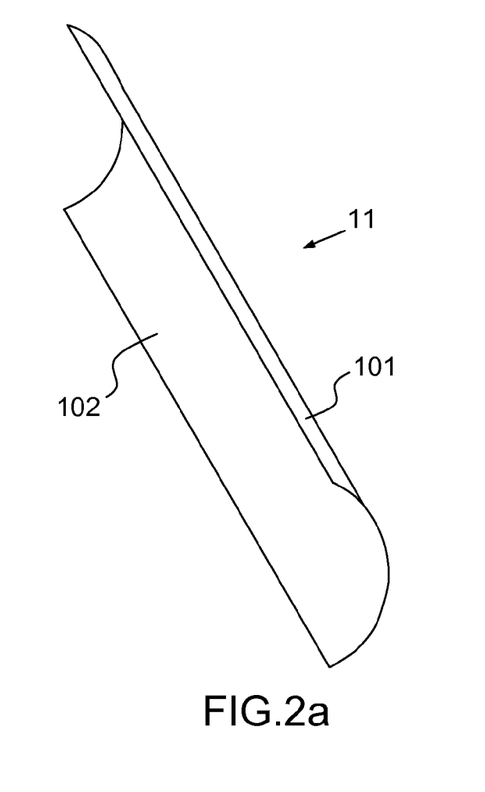
FIG. 2a: a diagrammatic perspective view of one example of a tape-spring in accordance with the invention in a deployed position.
Figure 2B:
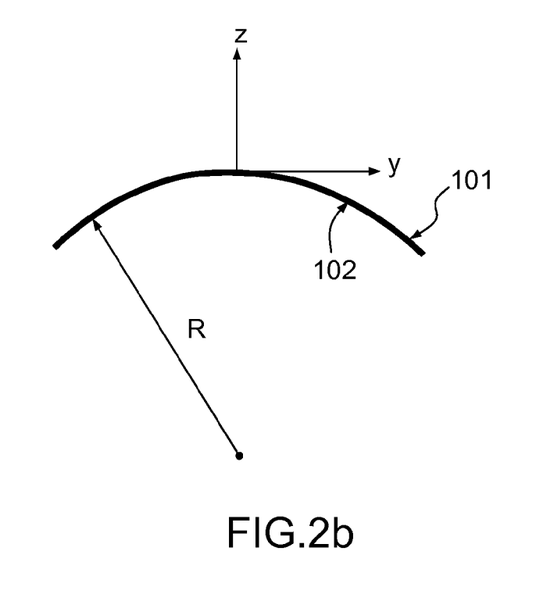
FIG. 2b: a diagrammatic cross section of the tape-spring in accordance with the invention.

Tape-springs are known in the space art as being flexible blades or strips having a convex first face 101, a concave second face 102 and a section of circular arc shape with radius of curvature R, as shown for example in FIGS. 2a and 2b. Tape-springs have a natural tendency to become autonomously deployed longitudinally, parallel to the deployment axis X, essentially thanks to their inherent elastic energy, without use of any motor.

Figure 3:
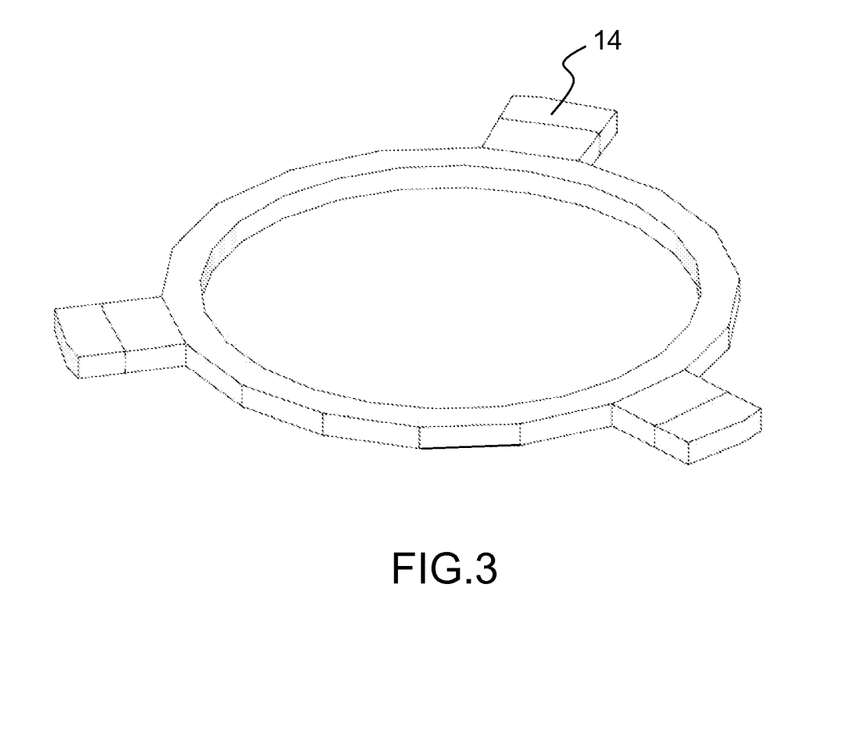
FIG. 3: a diagrammatic perspective view of one example of a lower or upper plate of the mast in accordance with the invention.

The upper platform 12 and the lower platform 13 of the elementary structural unit 10 may be rigid or elastic and have a shape that is preferably symmetrical about the axis X. The upper platform 12 and the lower platform 13 may for example each have a disc or ring shape, as shown for example in FIG. 3, and have a polygonal or circular peripheral contour. Each of the upper and lower platforms includes fixing lugs 14 that are preferably regularly distributed at its periphery, each fixing lug being dedicated to fixing one end of a tape-spring. When the elementary structural unit 10 includes three tape-springs, each of the upper and lower platforms includes three fixing lugs as shown in FIG. 3. The fixing lugs 14 are preferably regularly distributed around each upper platform 12 or lower platform 13 and are located in the plane YZ of the corresponding platform. In FIGS. 1 and 3, the fixing lugs 14 are oriented in such a way that they extend toward the exterior of the elementary structural unit 10 and therefore toward the exterior of the mast, but it is equally possible to orient them in the opposite direction so that they extend toward the interior of the elementary structural unit 10. Similarly, in FIG. 1, the tape-springs are oriented so as to have their concave face oriented toward the exterior of the mast, but it is equally possible to orient them in the opposite direction so that they have their concave face oriented toward the interior of the mast.

An elementary structural unit 10 including a single stage is the minimum configuration of the mast in accordance with the invention but is of limited benefit if great mast lengths are required because the stiffness of the mast decreases as the length of each tape-spring 11 increases. It is possible to increase the length of the mast by stacking a plurality of elementary structural units above one another but if each structural unit includes only one stage and there is a large number of structural units, the compactness of the mast in the folded position is then not optimized.

Figure 4:
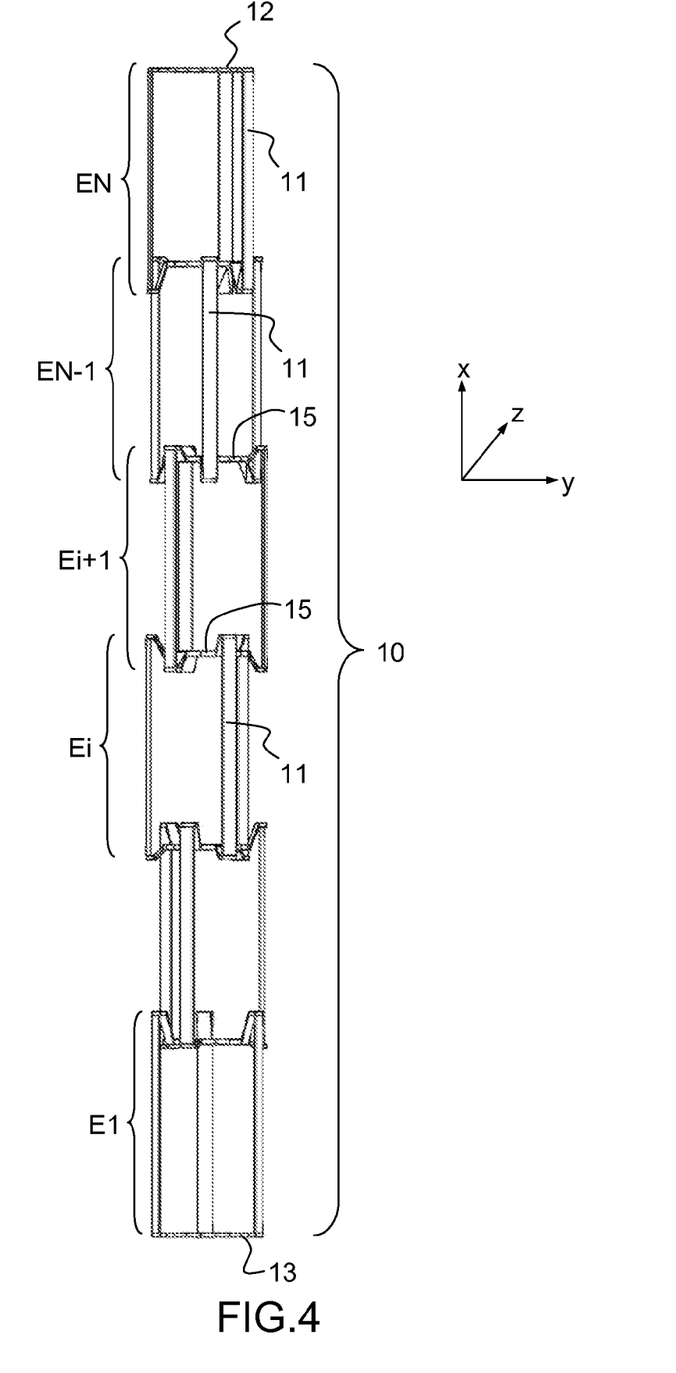
FIG. 4: a diagram of a second example of a mast in accordance with the invention in a deployed position, the mast including a multistage elementary structural unit.
Figure 5A:
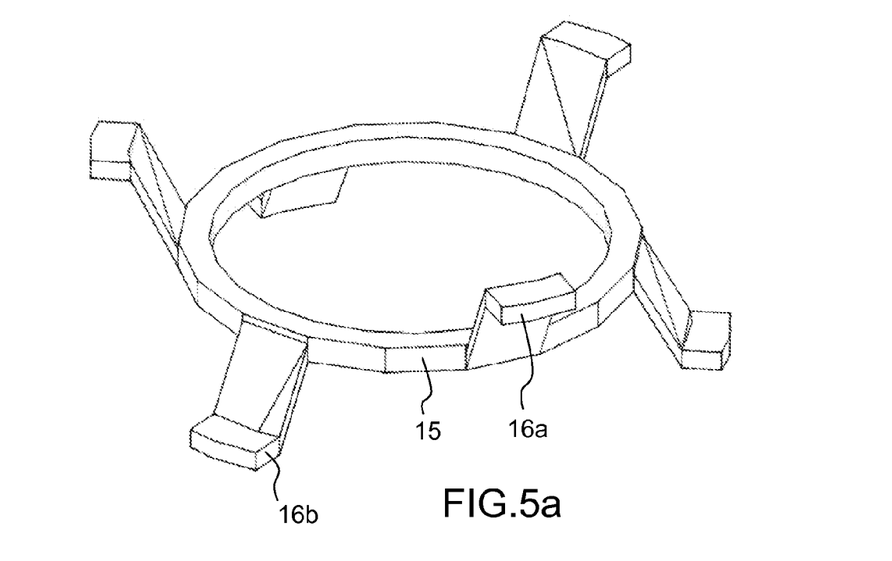
FIG. 5a: a diagrammatic perspective view of one example of a connecting platform between two contiguous stages of the same elementary structural unit in accordance with the invention.
Figure 5B:
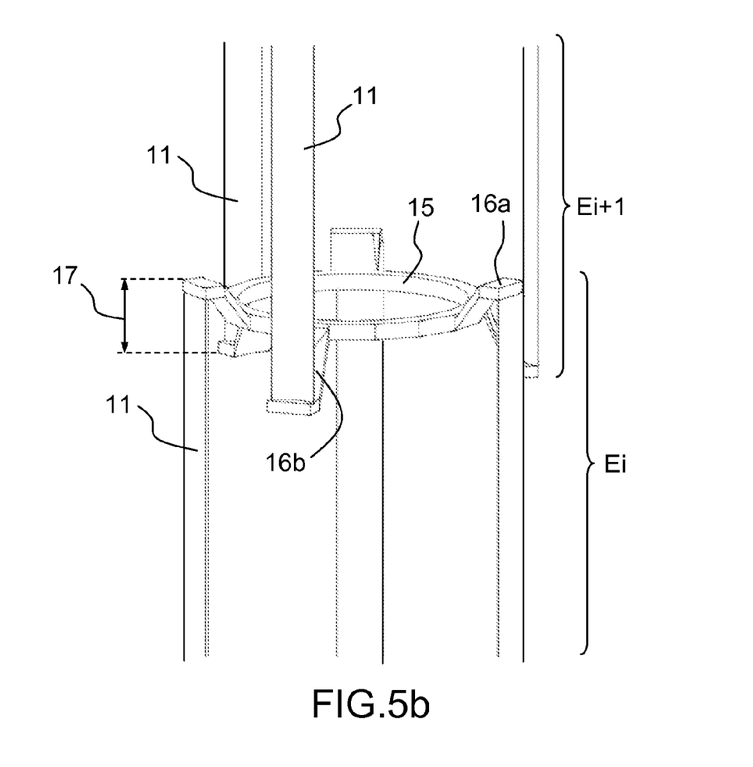
FIG. 5b: a diagrammatic perspective view of one example of fixing of tape-springs of two contiguous stages on a connecting platform in accordance with the invention.

FIG. 4 shows an example of a mast in the deployed position, the mast including an elementary structural unit 10 constituted of a lower platform, an upper platform and N stages E1, . . . ,Ei, Ei+1, . . . ,EN, where N is an integer number greater than 1 and i is between 1 and N−1 inclusive, stacked above one another parallel to the longitudinal deployment axis X and fixed rigidly to each other two by two. The lower platform 13 and the upper platform 12 are parallel to a plane YZ orthogonal to the axis X. Each stage includes at least three tape-springs 11 extending parallel to the longitudinal deployment axis X when in the deployed position, the three tape-springs 11 having two opposite ends respectively fixed to connecting platforms 15 or to the upper platform 12 or to the lower platform 13. Two contiguous stages Ei and Ei+1 may be fixed to each other by way of a connecting platform 15 common to the two contiguous stages, and the connecting platform 15 can be rigid or elastic. As shown for example in FIGS. 5a and 5b, each connecting platform 15 has a shape that is preferably symmetrical around the axis X such as a disc or ring shape, for example, and may have a polygonal or circular peripheral contour. Each connecting platform includes fixing lugs 16a, 16b, each fixing lug 16a, 16b being dedicated to fixing a respective end of a tape-spring 11 of a lower stage Ei, respectively an upper stage Ei+1 contiguous with the lower stage Ei. For fixing the ends of the tape-springs 11 of the two contiguous stages Ei, Ei+1, the number of fixing lugs 16a, 16b of each connecting platform 15 is twice the number of tape-springs 11 of a stage Ei of the elementary structural unit 10. Accordingly, when each stage Ei of the elementary structural unit includes three tape-springs, as shown in FIG. 4, each connecting platform 15 includes six fixing lugs, to which are respectively fixed six tape-springs 11 of a lower stage Ei and an upper stage Ei+1 that are contiguous. The fixing lugs 16a, 16b fastened to each connecting platform 15 are inclined relative to the plane YZ of the connecting platform 15, the inclination being oriented in opposite directions for the tape-springs of the upper stage Ei+1 relative to the lower stage Ei. The fixing lugs 16a of the tape-springs of the lower stage Ei may be inclined toward the top of the mast whereas the fixing lugs 16b of the tape-springs of the upper stage Ei+1 may be inclined toward the bottom of the mast, so as to create a longitudinal overlap area 17 between two contiguous stages Ei and Ei+1, which has the advantage of increasing the stiffness of the mast and of improving the compactness of the elementary structural unit 10 when folded in the stowed position. Two consecutive connecting platforms 15, which therefore belong to the same stage Ei, therefore include fixing lugs 16a, 16b oriented in opposite directions relative to the plane YZ of the two connecting platforms. In FIGS. 4, 5a, 5b, the fixing lugs 16a, 16b fastened to each connecting platform 15 are mounted at the external periphery of each connecting platform and extend toward the exterior of the mast, although it is alternatively equally possible to mount the fixing lugs 16a, 16b in the reverse direction so that they extend toward the interior of the mast.

The ends of the tape-springs 11 of each stage Ei may be built in to fix them in by means of flanges mounted on the fixing lugs 16a, 16b of the connecting platforms 15 or on the fixing lugs 14 of the upper platform 12 or the lower platform 13 or they may be riveted or glued. When the mast includes a plurality of elementary structural units 10, the lower platform 13 and the upper platform 12 located at the base and at the top of each elementary structural unit 10 provide the connection between the tape-springs 11 of two consecutive elementary structural units.

For the mast to be balanced, the fixing lugs 14, 15a, 15b and the tape-springs 11 that are fixed thereto may be preferentially regularly spaced around the longitudinal deployment axis X and the angles between two fixing lugs of each connecting platform may have identical values.

Two contiguous stages are offset angularly relative to each other by rotation about the deployment axis X so as to interleave the tape-springs of a lower stage Ei between the tape-springs of a contiguous upper stage Ei+1 and to interleave the fixing lugs 16a of a lower stage Ei between the fixing lugs 16b of a contiguous upper stage Ei+1. Thus the tape-springs 11 of two consecutive stages connected to the same connecting platform 15 are also offset angularly relative to each other.

Figure 6A:
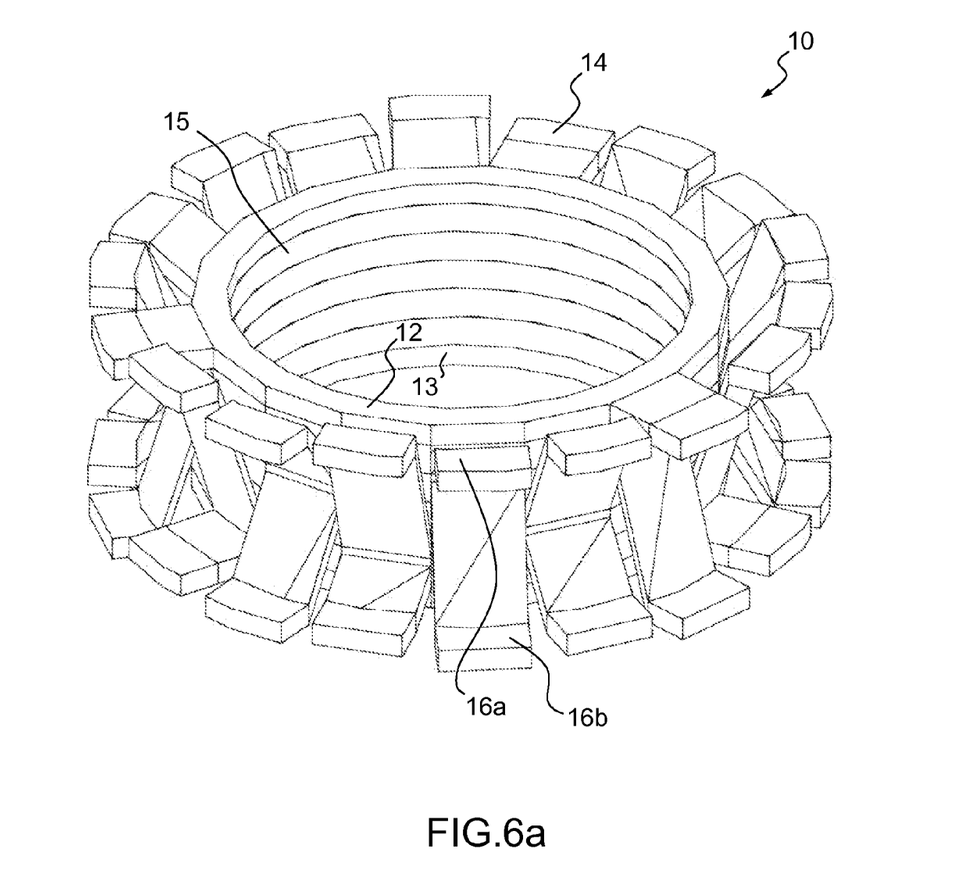
FIG. 6a: a diagrammatic perspective view, showing an elementary structural unit of the mast in accordance with the invention in a stowed position, the tape-springs being omitted.
Figure 6B:
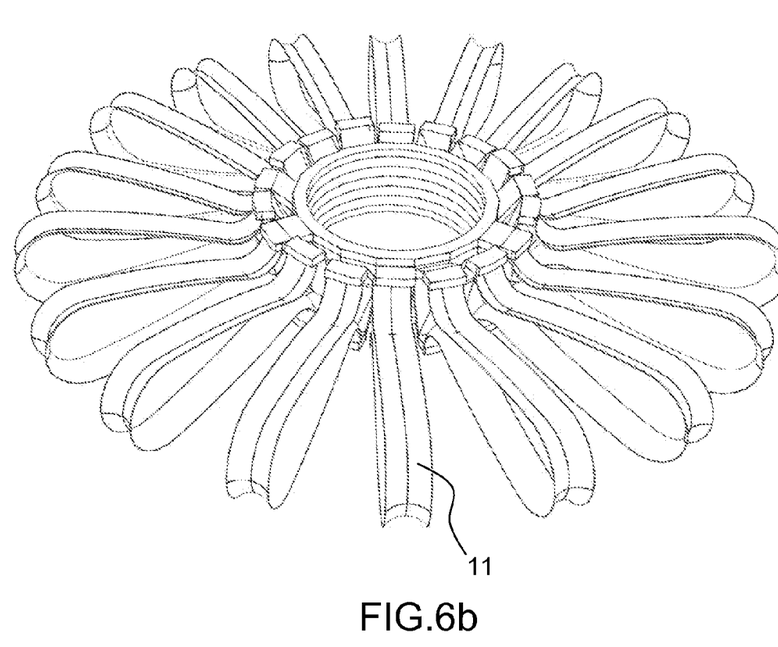
FIG. 6b: a diagrammatic perspective view, showing an elementary structural unit of the mast in accordance with the invention in a stowed position, the tape-springs being bent toward the exterior of the mast.
Figure 6C:
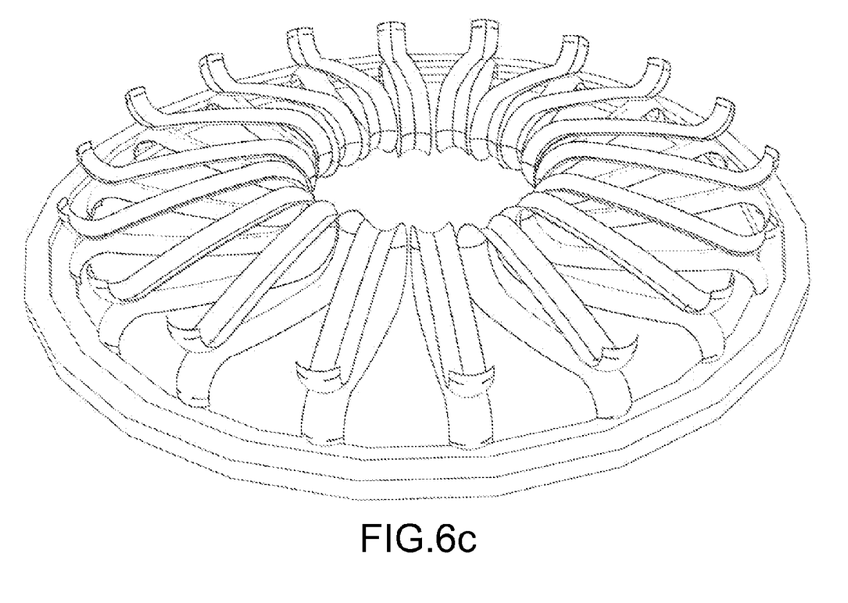
FIG. 6c: a diagrammatic perspective view, showing an elementary structural unit of the mast in accordance with the invention in a stowed position, the tape-springs being bent toward the interior of the mast.

When an elementary structural unit 10 is folded in the stowed position, it is in a compact state and all the upper platforms 12, lower platforms 13 and connecting platforms 15 between the various stages of the elementary structural unit are stacked above one another as represented in the FIG. 6a partial view in which the tape-springs are not shown, in FIG. 6b in which the tape-springs are shown bent toward the exterior of the mast and in the FIG. 6c partial view in which only the tape-springs bent toward the interior of the mast are shown. In FIGS. 6b and 6c, the elementary structural unit includes six stages made up of three tape-springs per stage, that is to say a total of 18 tape-springs regularly distributed on the circumference of an annular ring constituted of a stack of all the upper, lower and connecting platforms of the elementary structural unit in the stacked state. In this compact state, the tape-springs 11 are bent in two on themselves in the direction of their length, and the bending can be toward the exterior of the mast when the fixing lugs extend toward the exterior of the mast as shown in FIG. 6b or when the fixing lugs 16a, 16b extend toward the interior of the mast the bending can be toward the interior of the mast as shown diagrammatically in FIG. 6c. Two consecutive connecting platforms 15, which therefore belong to the same stage Ei, include fixing lugs 16a, 16b mounted opposite one another, the distance between which is determined to provide for maximum elastic bending of the tape-springs. This distance is identical for each facing pair of fixing lugs.

The tape-springs 11 are produced in a material compatible with a space environment and may be produced in a metal or in a composite material such as carbon fibres embedded in an epoxy resin or in a cyanate resin, for example. Composite materials are preferred as they have a much lower coefficient of thermal expansion than metals. The upper and lower platforms and the connecting platforms are preferably made of carbon.

The mast does not include any articulation, hinge, pivot or motor. In the stowed position, all the tape-springs 11 of all the elementary structural stages Ei store elastic energy because of the forces that keep them in the folded-in-two position. The tape-springs 11 are kept in the folded position by a stacking system. The passive deployment of the mast is effected by releasing the forces on the tape-springs when they are deployed and releasing the elastic energy stored by the tape-springs. For deployment not to be too violent, it is possible also to use braking means enabling control of the deployment of the mast. For example, the rate of deployment of the tape-springs may be controlled by progressive paying out of a cable under the control of a motor.

Figure 7:
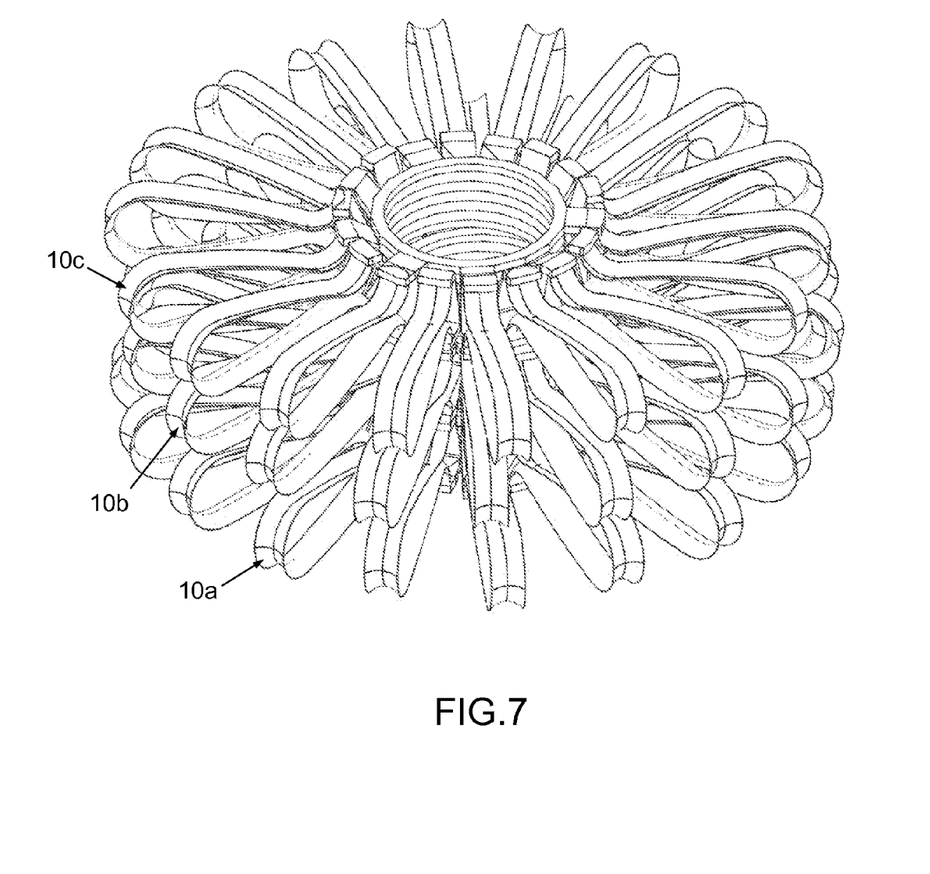
FIG. 7: a diagrammatic perspective view, showing a mast in accordance with the invention in a stowed position, the mast including three elementary structural units stacked and fixed above one another, the tape-springs being bent toward the exterior of the mast.

The length of the mast may be increased or decreased simply by increasing the number of successive elementary structural units stacked above one another along the longitudinal deployment axis X as shown for example in FIG. 7 in which the mast includes three structural units 10a, 10b, 10c stacked above one another, the three structural units being in their stacked and therefore compact state. In the FIG. 7 embodiment, in the stacked position each structural unit 10a, 10b, 10c corresponds to an annular ring constituted of six stages composed of three tape-springs per stage, that is to say a total of 18 tape-springs regularly distributed on the circumference of the annular ring. The three stacked annular rings correspond to the three elementary structural units.

For space applications, the mast may be used for example to move equipment or an antenna away from the body of a satellite. In this case, the lower platform 13 of the lower stage of the mast is fixed to the body of the satellite and the equipment to be moved away is fixed to the upper platform 12 of the upper stage of the mast.

Although the invention has been described in connection with particular embodiments, it is obvious that it is no way limited to them and that it encompasses all technical equivalents of the means described and combinations thereof if the latter fall within the scope of the invention. In particular, all the figures show a configuration of the tape-springs having their concave face 102 oriented toward the exterior of the mast, but alternatively it is equally possible to turn all the tape-springs 11 through 180° and to mount them so that they have their convex face 101 oriented toward the exterior of the mast.

The invention claimed is:

1. An autonomous spontaneous deployment deployable mast including at least one elementary structural unit having a longitudinal deployment axis X, the elementary structural unit including a lower platform and an upper platform both parallel to a plane YZ orthogonal to the axis X and N stages stacked above one another parallel to the longitudinal deployment axis X, where N is greater than 1, wherein each stage includes at least three longitudinal flexible tape-springs, the N stages being fixed to one another two by two by means of connecting platforms parallel to the plane YZ and wherein two contiguous lower and upper stages are offset angularly relative to each other by rotation about the deployment axis X, the tape-springs of the lower stage being interleaved between the tape-springs of the upper stage.

2. The deployable mast according to claim 1, wherein all the tape-springs are identical and of the same length.

3. The deployable mast according to claim 2, wherein two contiguous lower and upper stages are fixed to each other by a connecting platform common to the two contiguous stages.

4. The deployable mast according to claim 3, wherein each upper platform, lower platform and connecting platform includes regularly distributed fixing lugs, each fixing lug being dedicated to fixing one end of a tape-spring.

5. The deployable mast according to claim 4, wherein the two contiguous lower and upper stages include a longitudinal overlap area.

6. The deployable mast according to claim 5, wherein the fixing lugs fastened to each connecting platform are inclined relative to the plane YZ of the connecting platform, the inclination of the fixing lugs of the tape-springs of the lower stage being oriented toward the top of the mast and the inclination of the fixing lugs of the tape-springs of the upper stage being oriented toward the bottom of the mast.

7. The deployable mast according to claim 1, wherein, in the stowed position, all the tape-springs are bent in two, in the direction of their length, and wherein all the lower, connecting and upper platforms of the same structural unit are stacked above one another.

8. The deployable mast according to claim 1, including a plurality of identical structural units stacked above one another.

9. A satellite including at least one autonomous spontaneous deployment deployable mast according to claim 1.

* * * * *